(12) United States Patent
Pentel

(10) Patent No.: US 6,880,750 B2
(45) Date of Patent: Apr. 19, 2005

(54) REMOTE ORDERING DEVICE

(76) Inventor: Randolph M. Pentel, 815 Deer Trail Ct., Mendota Heights, MN (US) 55118

( * ) Notice: Subject to any disclaimer, the term of this patent is extended or adjusted under 35 U.S.C. 154(b) by 157 days.

(21) Appl. No.: 10/222,158

(22) Filed: Aug. 16, 2002

(65) Prior Publication Data
US 2002/0190120 A1 Dec. 19, 2002

Related U.S. Application Data

(63) Continuation-in-part of application No. 09/684,185, filed on Oct. 6, 2000, now Pat. No. 6,435,406, which is a continuation-in-part of application No. 09/384,961, filed on Aug. 27, 1999, now Pat. No. 6,425,524, which is a continuation-in-part of application No. 09/062,093, filed on Apr. 17, 1998, now Pat. No. 5,969,968.

(51) Int. Cl.[7] ................................................ G06K 5/00
(52) U.S. Cl. ........................ 235/380; 235/383; 235/381
(58) Field of Search ................................. 235/384, 380, 235/375, 379; 705/39, 42, 43, 26

(56) References Cited

U.S. PATENT DOCUMENTS 6,435,406 B1 * 8/2002 Pentel ......................... 235/380
6,473,739 B1 * 10/2002 Showghi et al. .............. 705/26

* cited by examiner

Primary Examiner—Karl D. Frech
(74) Attorney, Agent, or Firm—Nikolai & Mersereau, P.A.

(57) ABSTRACT

A remote ordering device for placing orders though cell phones or other data entry and wireless transmission devices and a data receiving station to receive the data, process the orders and keep track of accounts, inventory and retain other data as required. The receiving station can be in communication with other receiving stations to forward orders or data. The receiving station can provide instructions to a person or machine to fill orders at any desired location. The instructions may be printed out or displayed on a screen. A GPS, WAP or other location finding systems, may be used to identify the user's location. Bioelectronics, Caller I.D, pin numbers or other identification means can be used to verify the user for debiting accounts or credit cards. Users can remotely order tickets, meals, services, or control machines remotely and either arrange for pick up at a desired location or for delivery.

45 Claims, 10 Drawing Sheets

Fig. 6a

```
ENTER ITEM NUMBER

```
ENTER ITEM NUMBER 1   2

PRESS ENTER BUTTON
```

Fig. 7

```
HAMBURGER QUANTITY 0   2

PRESS ENTER
```

Fig. 8

```
1. HAMBURGER - 2
    TOTAL:

$1.75

PRESS ENTER BUTTON
```

Fig. 9

PRESS ENTER TO ORDER ITEM
PRESS REMOVE TO REMOVE ITEM
PRESS FINISH TO END $1.75

Fig. 10

YOUR TOTAL IS:

$4.73

PLEASE PULL FORWARD

Fig. 11a

| ITEM | SELECTION | COUNT |
|---|---|---|
| 01 | HAMBURGERS | 2 |
| 02 | FRENCH FRIES | 2 |
| 03 | MILK SHAKE | 1 |

|  |  |
|---|---|
| SUBTOTAL | $4.35 |
| TAX | $0.28 |
| TOTAL | $4.73 |

ENTER ITEM NUMBER TO REMOVE

<u>0</u>  <u>1</u>

PRESS ENTER BUTTON

Fig. 11b

| ITEM | SELECTION | COUNT | SUBTOTAL |
|---|---|---|---|
| 01 | HAMBURGERS | 2 | $2.05 |
| 02 | FRENCH FRIES | 2 | $1.30 |
| 03 | MILK SHAKE | 1 | $1.00 |

|  |  |
|---|---|
| SUBTOTAL | $4.35 |
| TAX | $0.28 |
| TOTAL | $4.73 |

ENTER ITEM NUMBER TO REMOVE

<u>0</u>  <u>1</u>

PRESS ENTER BUTTON

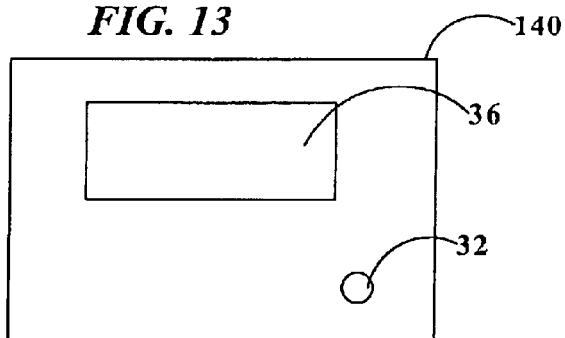
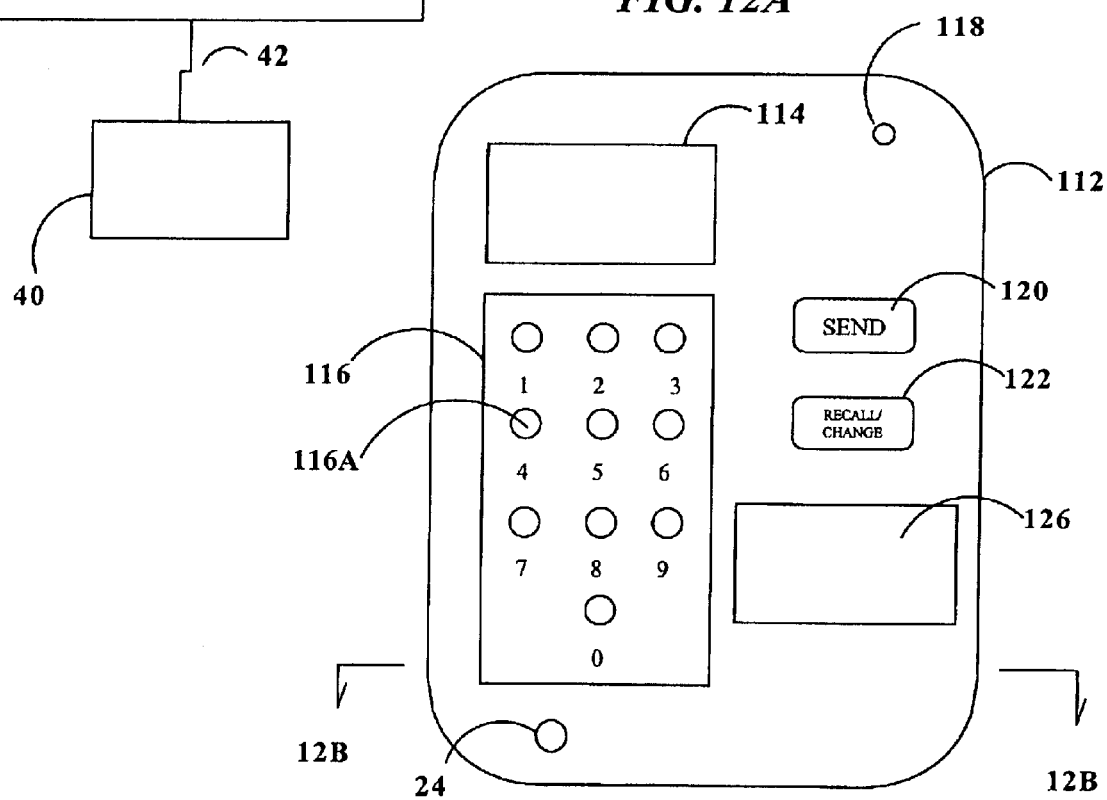
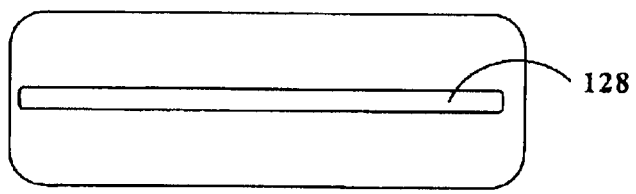

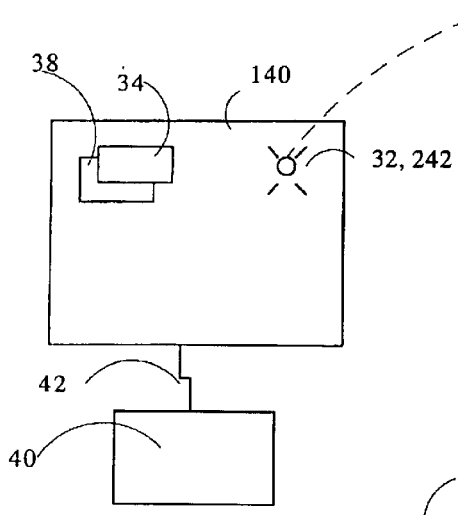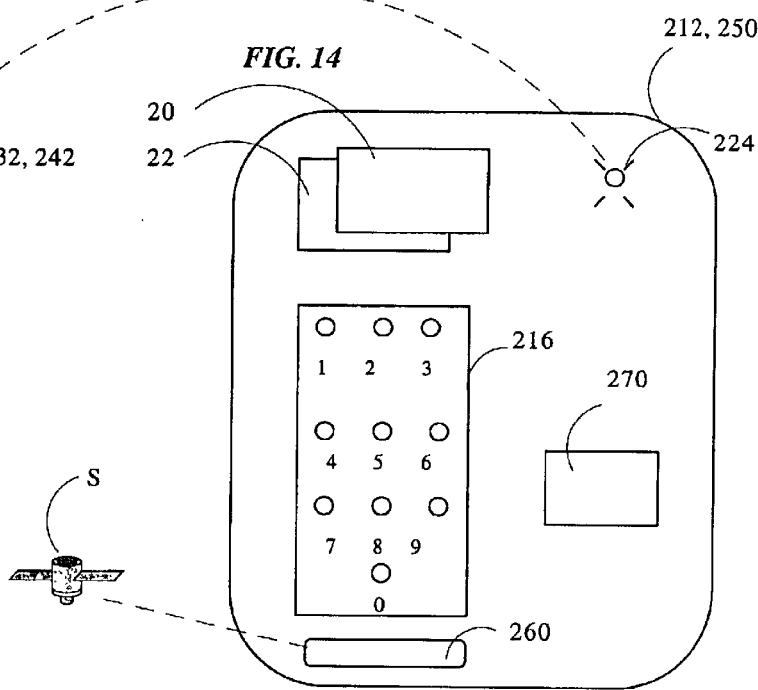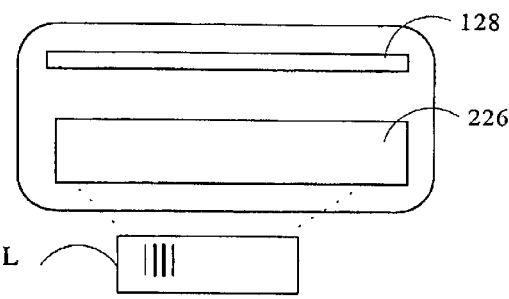
FIG. 15
FIG. 14
FIG. 16

REMOTE ORDERING DEVICE

This is a continuation-in-part of application Ser. No. 09/684,185 filed Oct. 6, 2000 and issued as U.S. Pat. No. 6,435,406 on Aug. 20, 2002 which is a continuation-in-part of application Ser. No. 09/384,961 filed Aug. 27, 1999, and issued as U.S. Pat. No. 6,425,524, which is a continuation-in-part of application Ser. No. 09/062,093 filed Apr. 17, 1998 and issued as U.S. Pat. No. 5,969,968.

BACKGROUND OF THE INVENTION

This invention relates to a remote ordering systems in general.

The drive-through lanes in many restaurants have added a very beneficial feature for both the consumer and the proprietor. The drive-through allows the proprietor to remain open longer, while the restaurant is being cleaned for the next day. The drive-through also allows more efficient handling of customers with a reduction in staff count.

The customer gets the benefit of staying in his or her vehicle while being serviced. That is especially important to young families and to those with mobility problems, such as the aged or infirm.

Drive-through lanes have been around for quite some time. However, in the typical drive-through lane, a customer places an order by speaking into a microphone to an attendant. The quality of these microphones is generally poor, resulting in miscommunication and errors in the order. By the time the customer finds out about the error, he has already waited in line several minutes and must then wait several more minutes for a correct order to be filled. This results in the loss of customer goodwill.

A problem with previous drive-through ordering systems that do not use a microphone is that they require the customer to lean out of the vehicle to press a button on a menu or use a touch screen. This is awkward if not impossible for some people, such as very obese people. Also, this exposes the customer to rain, snow, etc., while the order is being placed. Generally speaking, there is no feedback as to the type, quantity, or total price of items ordered, and no capability to back up to correct an incorrectly entered item.

There is a need for a remote ordering system for a drive-through lane that addresses the above problems. Additionally, the system should provide a completely transportable, hand-held remote device that can be assigned to customers who order frequently from the restaurant. Optimally, the device will have a customer identification, which is transmitted with each order so that the restaurant can perform statistical analysis.

This application also relates to the use of a remote ordering device by wait staff within a restaurant, to place orders, determine the status of orders, and allow the customer to pay the bill either by cash or credit card.

There is a need for a hand held remote device on which a server in a restaurant enters each customer's food and beverage order and then electronically sends the information directly to the kitchen without the server having to personally take the order. Each server could handle additional tables more efficiently, increasing their income, and saving the restaurant staff salaries. The device can also have a credit card reader and signature "box" for the customer to complete the transaction at the table without having to wait in line at the cash register, or for the waitress to return with a credit slip to sign.

There is also a need for a generalized remote ordering device for customer use inside or outside a facility such as a restaurant, auto repair facility, retail store, grocery store, airport or other service facility. The remote ordering device is a handheld device that allows the customer to order and pay for products or services and access information.

SUMMARY OF THE INVENTION

A generalized remote ordering apparatus for customer and employee use within a restaurant, auto repair facility, retail store, grocery store, airport, theatre, Automated Teller Machine (ATM) or other service facility, to place orders, determine the status of orders, access information, and allow the customer to pay the bill either by cash when receiving the goods or services, by debiting an account, or use of a credit card, comprising:

(a) a data input and transmitting device, such as a cell phone or Personal Data Assistant (PDA) or personal computer (PC) with a cell phone for transmitting ordering data.

(b) an ordering station for receiving data from the transmitting device, either directly or through a cellular telephone system, said ordering station adapted to receive the data from said data input and transmitting device, communicate the order to be filled to an order filling point, account for the transaction by totaling the value of the items or services provided plus any taxes applicable and either presenting the bill for payment, or debiting a credit card or a customer account and optionally providing a receipt for the customer when the goods or services are received. The customer may pick up the goods or they can be delivered to the customer.

A principal object and advantage of the present invention is that it allows the customer to order items from a menu without the necessity to speak to an attendant. This results in more accurate orders.

Another object and advantage of the present invention is that a server can immediately send orders to a kitchen without having to personally deliver them such that the server can spend more productive time serving patrons, handle more tables, and thus save labor expenses.

Another object and advantage of the present invention is that orders are received faster, and the server can be notified of completed orders as soon as they are prepared in the kitchen. Food will not get cool waiting for servers to pick it up.

Another object and advantage of the present invention is that the individual orders will be automatically entered on a computer system, to be used in inventory management, internal control, and marketing as desired. If the patron wishes to pay cash, or does not want to use a credit card, the order will be identified electronically at the check out register. If the business establishment wishes to have all patrons come to the check out register for control, the credit card slip and bill could already be completed saving time at the register.

Another object and advantage of the present invention is that restaurant customers who are in a hurry can complete the credit card payment when the food is ordered, and not have to wait for the server to give them the bill. They could leave when they are finished eating.

Another object and advantage is to improve security of transactions by not having credit cards, which can be lost or stolen, or credit card imprints which can be used to steal card number. Electronic transfer of credit card data and identification information prevents loss by theft.

Another object and advantage of the present invention is that kitchen staff could always read the order, because no handwriting is involved.

Another object and advantage of the present invention is that the server's orders and tips could be constantly recorded automatically, even if charged at the table.

Another object and advantage of the present invention is that each server could have their own ordering device, for easy identification in the kitchen or for personal notes in the jacket.

The above objects and advantages would be equally applicable for use by a customer at a service facility such as a restaurant, auto repair facility, retail store, grocery store, airport, etc.

The generalized remote ordering apparatus may also be used by a business facility to allow the customer to select a predetermined order and then enter it remotely. For example, the service facility may post an order code on a World Wide Web page that is correlated to a particular predetermined order. After accessing the web page, the customer enters the order code into the input device and, while at the service facility, transmits the order code to the ordering station. The service facility may also require the customer to enter a credit card number before providing the order code.

The ordering menu can be transmitted to a cell phone, PDA or PC when a telecommunications link is established or the ordering menu may be in the memory of the cell phone PDA or PC. The menu can also be in a catalog or posted in a visible location at the establishment where the ordering is taking place, such as a sign in a drive through lane of a business or on a wall inside of a business establishment. For cell phones a voice menu can be used to make selections from.

Any type of item or service can be ordered remotely over a cell phone or other telecommunications link, the business receiving the orders can track who is placing the orders by the cell phone being used or the cell phone in combination with a personal identification number (PIN) a biometric identification device attached to the cell phone PDA or PC, or such a device at the point where the goods or services are delivered. The business can automatically keep track of inventory, and the accounting associated with the transaction such as credit card accounts, debiting accounts the customer has established at the business, preparing receipts, or directing that cash be collected to complete the transaction.

The customer need not remember the number of each business he desires to contact. One number can be provided which has a menu of businesses to contact and the orders may be placed on the at the number dialed and then transferred to the desired business or a link with the business can be made through the internet or by forwarding the call.

A two-way communications device can provide menus to make selections from. The selections can be made from goods from catalogs, or restaurant menus, or for tickets and seating in theaters, aircraft, hotels reservations, transactions at automatic teller machines, or ordering electronic payments to be made from bank accounts.

A menu for ordering goods or services may also include a selection of place for picking up the goods or designating a place for delivery.

Identification of the customer can be made by identifying the transmitter device assigned to the customer such as a cell phone number of this cell phone, or biometric information collected over the wireless transmitter or in person at the time of pick up or delivery of the goods or services. Other methods of identifying the customer include personal identification numbers (PIN) or possession of a chip having identification information. Other means of identification of the customer at the point of pickup include signatures, photographs, and chips in the possession of the customer such as imbedded chips in a customer card or tag.

A data output device such as a video display or print out can direct personnel at a business establishment to fill orders. The output devices may also be used to print labels, warranties, receipts, credit card slips, tickets, or other information for the customer or the business establishment.

Any type of wireless communications can be used such as cell phones, or other transmitters. The cell phones and transmitters may be connected to personal computers, personal data assistants, tablet personal computers or other data storage and manipulation devices. The wireless technology used can be by wide fidelity (Wi-Fi), Wireless Personal Networks or other systems. The connections may use bluetooth protocol or any other protocol.

Automatic ordering from one computer to another rather than from a customer directly can be made. For example appliances can ask for refills, such as a refrigerator asking a delivery service for more milk, heating system asking for more oil or propane, etc.

The ordering system can also be used to control appliances and controls in homes and businesses, such as turning on lights or security systems, adjusting the heating or cooling systems, etc.

The ordering system working with position location devices such as GPS and cell phone location systems can advice a user where the nearest provider of goods or services is located.

The data entered into the ordering device by the customer may be by pushing buttons, scanning bar codes, voice commands, or any other data entry means.

Mobile payments can be made for highway tolls, parking fees, without stopping a vehicle to increase throughput at tollgates and parking ramps. Cab fares, bus fares and other transactions can be completed while in transit.

BRIEF DESCRIPTION OF THE DRAWINGS

FIGS. 1 and 1a is a schematic of the present invention shown in the context of a restaurant drive-through lane.

FIG. 6A is a schematic of an "enter item number" display.

FIG. 6B shows the "enter item number" display after an item number has been entered.

FIG. 7 is a schematic of an "item identifier and quantity" screen with the item quantity filled in by the customer.

FIG. 8 is a schematic of an "item total" screen.

FIG. 9 is a schematic of an "enter/remove/finish" screen.

FIG. 10 is a schematic of an "order total" screen.

FIG. 11A is a schematic of one embodiment of a "remove item" screen.

FIG. 11B is a schematic of another embodiment of a "remove item" screen.

FIG. 12A is a schematic of an input device for a generalized remote ordering apparatus.

FIG. 12B is a schematic cross-section along the lines 12B of FIG. 12A.

FIG. 13 is a schematic of an ordering station for a generalized remote ordering apparatus.

FIG. 14 is a schematic of another embodiment of an input device for a generalized remote ordering apparatus.

FIG. 15 is a schematic of an ordering station for use with the input device of FIG. 14.

FIG. 16 is a schematic end elevational view.

DETAILED DESCRIPTION OF THE PREFERRED EMBODIMENTS

Figure 1:
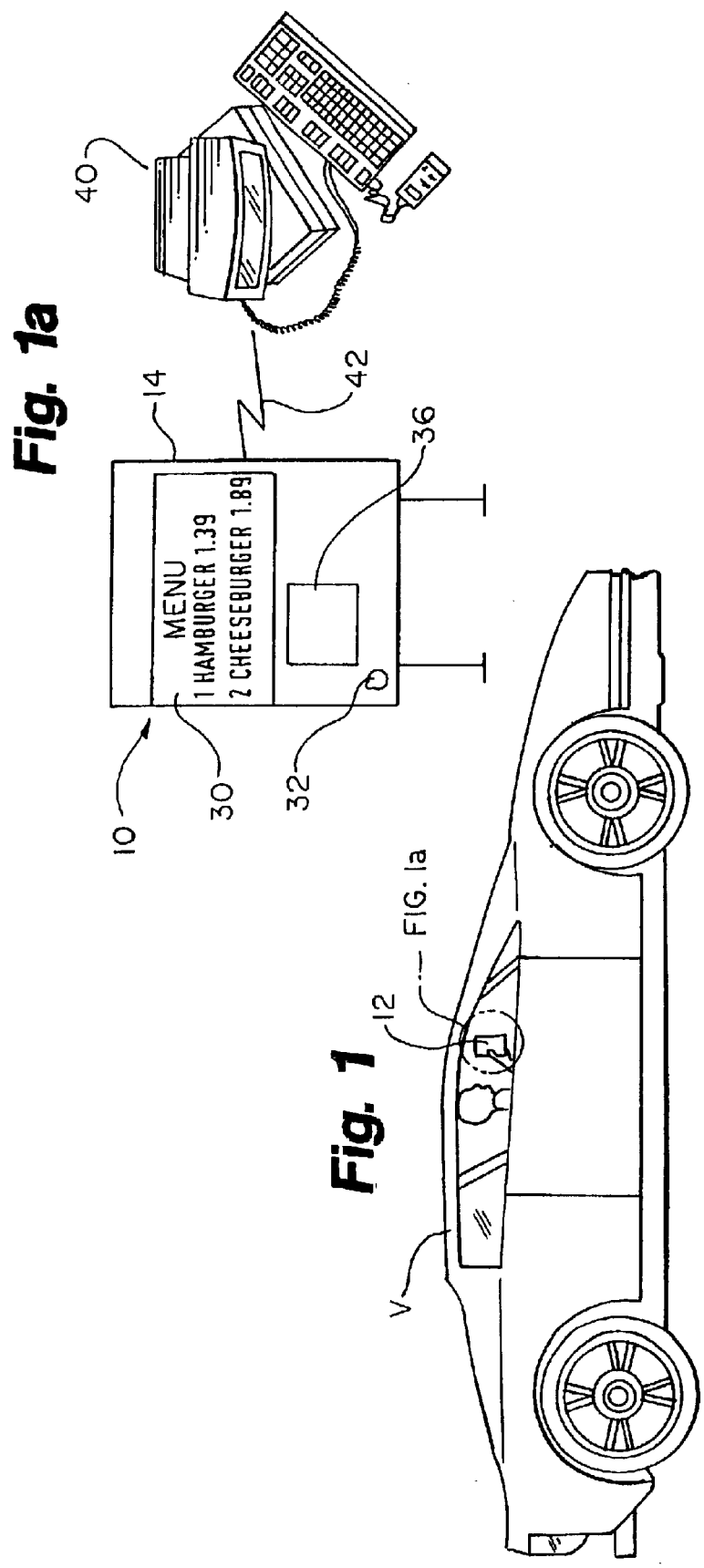

The remote ordering system for a restaurant drive-through lane of the present invention is generally designated in the Figures as referenced numeral 10.

The remote ordering system 10 comprises an input device 12 and a drive-up ordering station 14. The input device 12 is unconnected to the drive-up ordering station 14, and the input device is used from inside the vehicle V. Preferably, the input device 12 is hand-held and is transportable away from the drive-up ordering station 14. Multiple devices 12 may be used, with a separate device being assigned to each customer. In this embodiment the input device 12 is preferably used within direct line-of-sight of the drive-up ordering station 14. That is, it is not intended that the devices operate while greatly separated, as for example over a telephone network.

Figure 3:
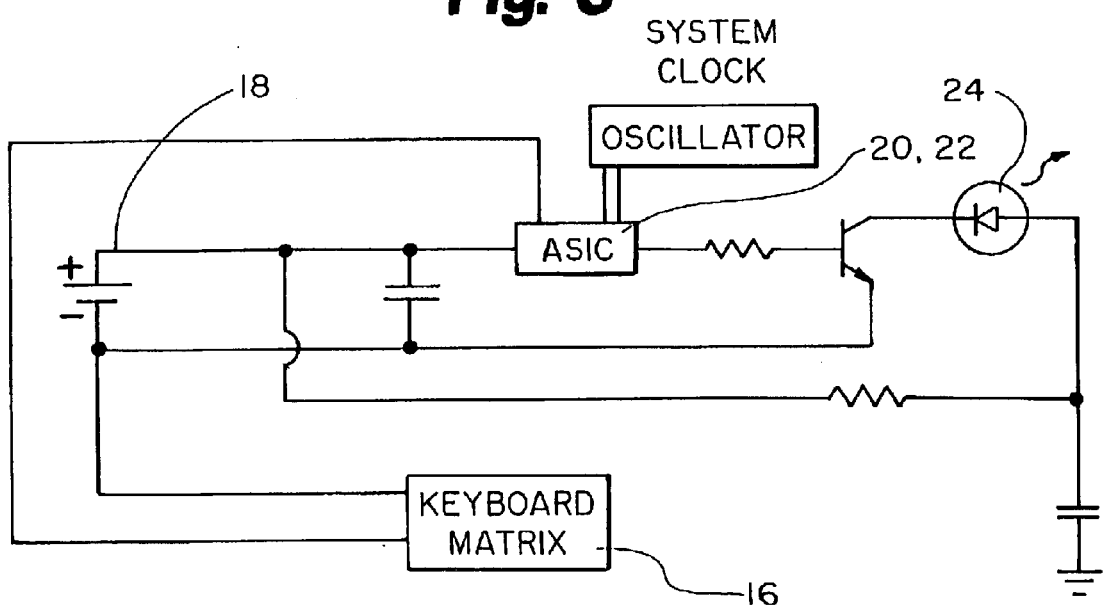
FIG. 3 is an electrical block diagram of the components of the remote hand-held device.

Preferably, the input device 12 has a keypad 16, battery 18, a first memory 20, a first processor 22, and a transmitter 24. The first memory 20 and the first processor 22 may be discrete components, or they may both be in an Application Specific Integrated Circuit (ASIC) as seen in FIG. 3. A customer identification number may be stored in the first memory 20 for transmission to the drive-up ordering station with the order.

Figure 2:
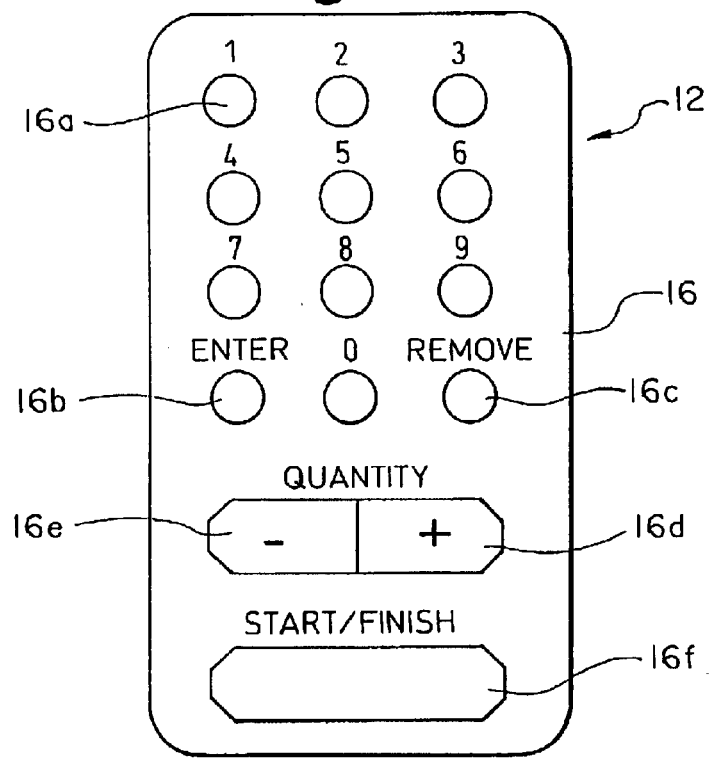
FIG. 2 is a schematic of the remote hand-held device of the present invention.

The keypad 16 further preferably comprises a number of numeric keys 16a, an enter key 16b, a remove key 16c, a quantity add key 16d, a quantity subtract key 16e, and a start/finish key 16f, as seen in FIG. 2.

Figure 4:
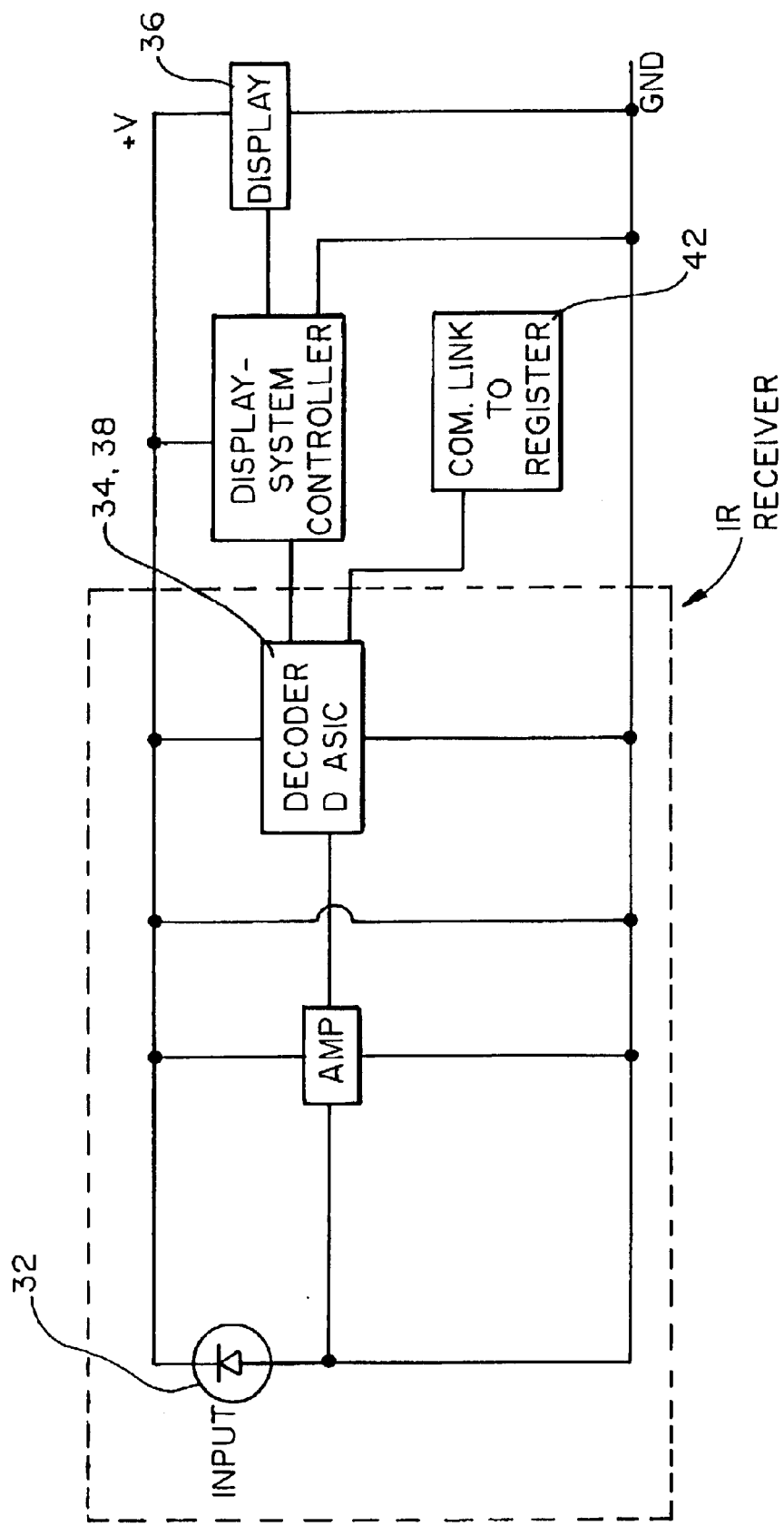
FIG. 4 is an electrical block diagram of the components of the drive-through station.

The drive-up ordering station 14 has a posted visual menu 30, which has the description and order number of various food items. A receiver 32 is tuned to the transmitter 24. The station 14 also has a second processor 34 which is adapted to decode information received from the transmitter 24 through the receiver 32 and produce decoded information. The decoded information, for example, item description and price, is displayed on a display 36. A second memory 38 stores item numbers, descriptions, and prices which may be received from a point-of-sale system 40 through a communications link 42. The second memory 38 and second processor 34 may be discrete components, or they may both be in an Application Specific Integrated Circuit (ASIC) as seen in FIG. 4.

The transmitter 24 and receiver 32 may operate either with radio frequency (RF) transmissions or with infrared (IR) transmissions.

Figure 5:
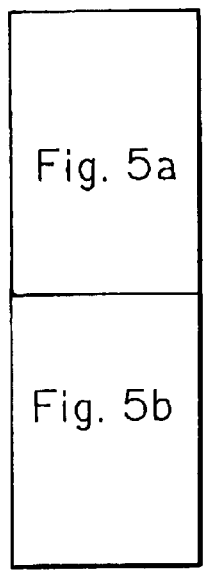
FIG. 5 is a flowchart of the data processing method of the present invention.
Figure 5A:
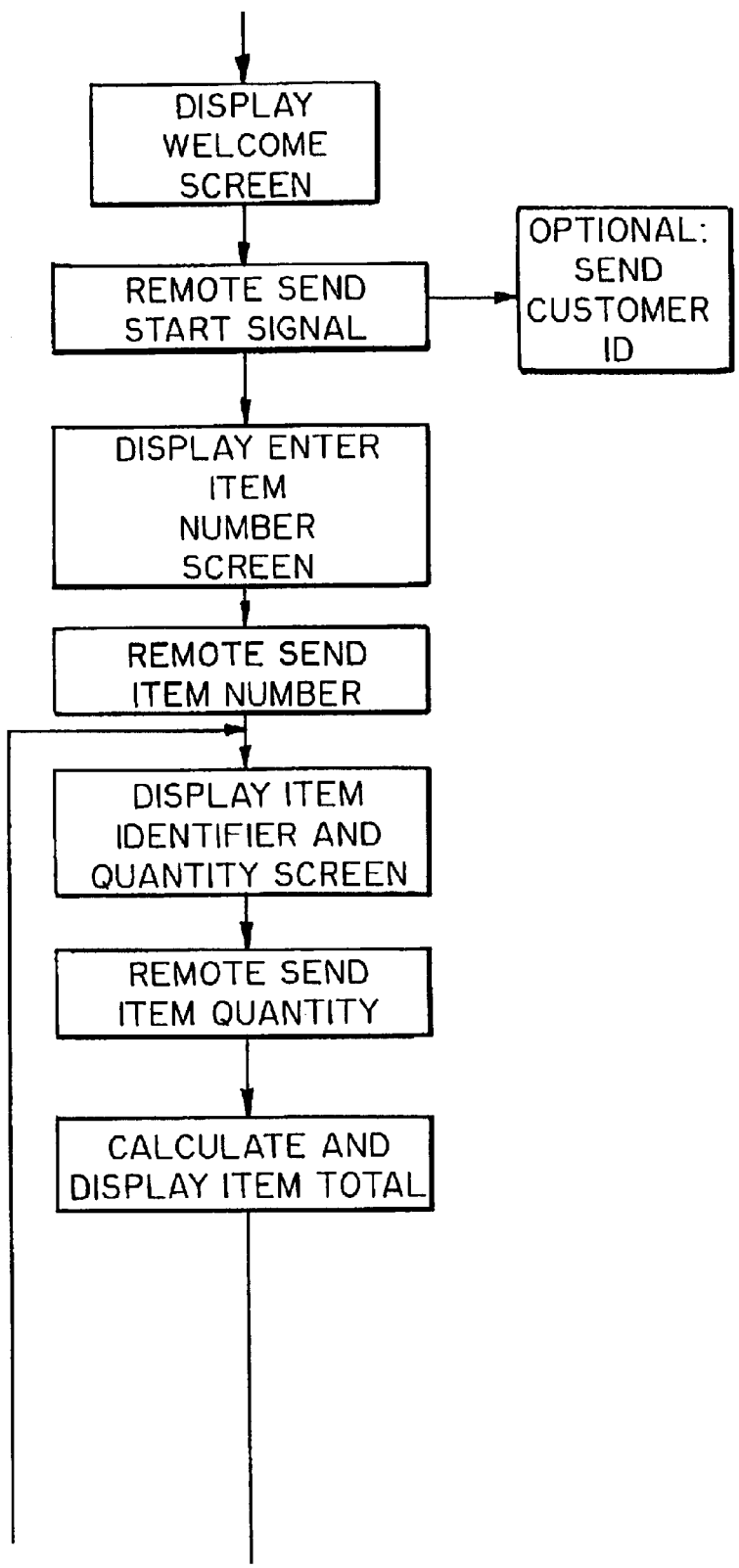
Figure 5B:
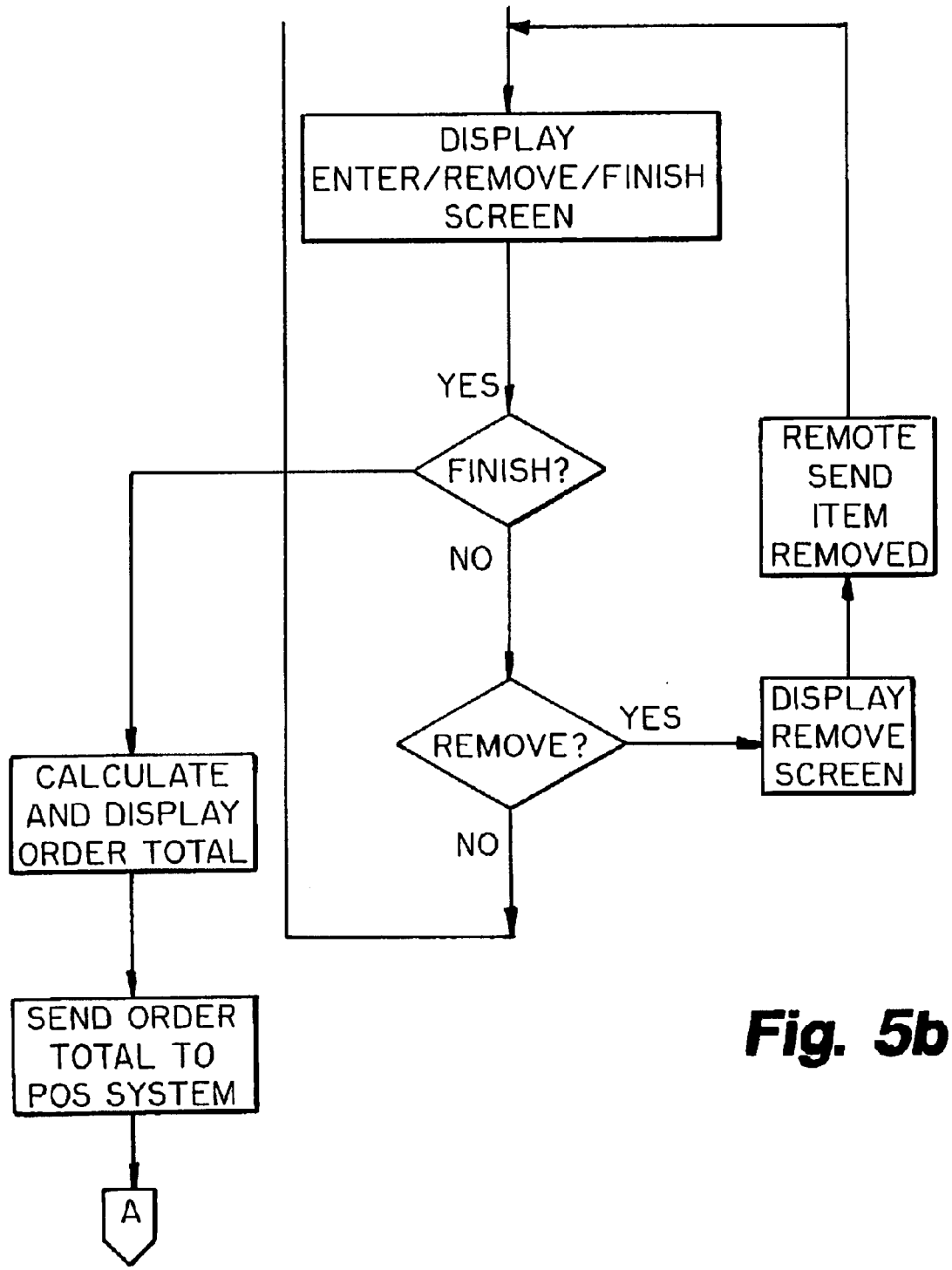

The remote ordering system 10 further comprises remote software executing in the first processor 22 and managing the remote input device 12; and ordering station software executing in the second processor 34 managing the ordering station 14. A flowchart of the remote software and ordering station software is shown in FIG. 5.

First, the ordering station software displays a "welcome" screen on the display 36. The welcome screen may invite the customer to initiate a transaction by pressing the start key 16f on the remote device 12.

The customer then presses the start key 16f on the remote device 12, causing a signal to be sent from the transmitter 24 to the receiver 32. The start signal is decoded by the ordering station software executing in the second processor 34.

In the next step, the ordering station software causes an "enter item number" screen (FIG. 6A) to be displayed on the display 36. The item numbers available to the customer will be shown on the posted menu 30 along with a description of the item (hamburger, cheeseburger, etc.) associated with the item number.

In response to the "enter item number screen," the customer presses one or more of the numeric keys 16a to input the item number (FIG. 6B). The customer then initiates transmission of the item number to the ordering station 14 by, for example, pressing the "enter" key 16b.

The item number is received by the receiver 32 and decoded by the ordering station software executing in the second processor 34. The ordering station software then associates the item number with an item description by looking in a table held in the second memory 38.

Next, the ordering station software sends an "item identifier and quantity" screen (FIG. 7) to the display 36. This screen invites the customer to enter the quantity of this item desired.

The customer inputs the quantity of this item desired by using the numeric keys 16a and optionally the quantity add key 16d and/or quantity subtract key 16e. The customer then initiates transmission of the item quantity by, for example, pressing the "enter" key 16b.

The receiver 32 receives the item quantity for the first item and passes this to the second processor 34 for decoding. The second processor then makes an entry for the quantity of the first item in the second memory 38. The second processor looks up the price of this item from a table maintained in the second memory 38 and calculates an item total for the first item. The ordering station software then transmits an item total screen (FIG. 8) for the first item to the display 36.

When the customer presses the "enter" key again, a transmission signaling pressing of the "enter" key is sent to the ordering station 14. The ordering station software then transmits an "enter/remove/finish" screen (FIG. 9) to the display 36.

The customer has three choices by which he may respond to the "enter/remove/finish" screen.

If the "enter" key is pressed, the remote device 12 signals the ordering station 14 to bring up an "enter item number" screen (FIG. 6A) to begin the process described above for ordering another item.

If the "remove" key 16c is pressed, the remote device 12 signals the ordering station to bring up a "remove item" screen (FIG. 11A). This screen will list the item(s) ordered by item number, description, and quantity and display an order total. Optionally, the order subtotals may also be displayed (FIG. 11B). By using the numeric keys 16a, the customer indicates which item number to remove, then presses the "enter" key to signal the ordering station software to remove that item from the order. The ordering station software then redisplays the "enter/remove/finish" screen.

If the "finish" key 16f is pressed, the remote device 12 signals the ordering station to calculate an order total for all items and quantities ordered. The ordering station software then causes an order total screen (FIG. 10) to be displayed on the display 36.

The ordering station software then sends the order information to the point-of-sale system via the communications link 42.

The point-of-sale system may load item numbers, descriptions, and prices into the ordering station through the communication link 42.

A generalized remote ordering apparatus comprises an input device 112 having a keypad 116, a battery 18, a first memory 20, a first processor 22, and a transmitter 24 (see FIGS. 3 and 12A). The first memory 20 and first processor 22 may be discrete components, or they may both be in an Application Specific Integrated Circuit (ASIC) as seen in FIG. 3. A user/server indicator may be stored in the first memory 20 for transmission to the ordering station 140 to identify the user/server.

The remote ordering apparatus further comprises an ordering station 140 unconnected to the input device 112, the ordering station 140 having receiver 32 tuned to the transmitter 24. The remote ordering station 140 also has a second processor 34, which is adapted to decode information received from the transmitter 24 through the receiver 32 and produce decoded information. The remote ordering station 140 also has a display 36 adapted to display the decoded information. A second memory 38 stores item numbers, descriptions, and prices, which may be received from a point-of-sale system 40 through a communications link 42. The second memory 38 and second processor 34 may be discrete components, or they may both be in an Application Specific Integrated Circuit (ASIC) as seen in FIG. 4.

The input device 112 may have a display window 114 for displaying information. Preferably, the display window 114 is a liquid crystal display.

The input device 112 may have an order ready indicator 118 which is turned on by transmission from the ordering station 140 when an order is ready for pickup. Preferably, the order ready indicator is a lighted indicator such as an LED, but could also be a chime or vibrator.

The keypad 116 preferably has a plurality of numeric keys 116A to input selections from menu items and customer data. Most preferably, the numeric keys 116A further comprise keys labeled 0 through 9, as shown in FIG. 12A. For example, a standard telephone keypad could be used as the numeric keys 116A.

The keypad 116 further comprises an order send button 120, which is pressed to transmit an order to the ordering station 140.

The keypad 116 further comprises a recall/change button 122 which can be used to recall or change a previously submitted order by entering the order number and pressing the recall/change button 122.

The input device 112 preferably has a credit card slot 128 for swiping a credit card to read the magnetic strip on the credit card. The input device 112 may also have a credit card signature block 126 adapted to electronically record the signature of a credit card holder.

The transmitter 24 and receiver 32 may operate either with radio frequency (RE) transmissions or with infrared (IR) transmissions. Preferably, RE transmissions are used.

The remote ordering apparatus preferably comprises a plurality of the input devices 112, each of said plurality of input devices 112 being separately transportable away from the ordering station 140.

A customer of the service facility may place orders or acquire other information from the service facility by means of a method using the generalized remote ordering apparatus.

The service facility provides an order code to the customer who is using the input device, after correlating the order code to a predetermined order. For example, order code 1 could be correlated to a hamburger, fries, and a coke. The user of the input device then enters the order code into the input device 112 by means of the keypad 116 and presses the order send button 120, which causes the order number to be transmitted to the ordering station. The user may operate the input device 112 either inside or outside the service facility, depending on the range of the transmitter 24.

To provide order codes to the general public, the owner of the service facility may post a menu of order codes on a World Wide Web page. For example, if a retail store is having a special promotion, the store may post order codes for items, which are on sale on its web site. The shopper then prints out a list of these order codes and, after entering the store, enters the order codes into the input device 112 and transmits them to the ordering station 140.

Alternatively, the service facility could also provide a catalog for use by a customer, which each customer being given an input device for shopping, and the catalog having the order codes. The input device 112 could be programmed to accept a number of order codes and transmit them serially to the ordering station 140 with one press of the order send button. When the order is ready, the order ready indicator will be turned on, and the customer may pick up the order.

In an alternative arrangement, the service facility may reveal an order code, on a web site or otherwise, only after verifying the identity of the requester, and may additionally require the requester to pay for the order with a credit card number before receiving the order code. In another arrangement, the requester pays for the order after entering it by swiping his credit card through the credit card slot 128, which transmits the credit card number and expiration date to the point-of-sale system through the ordering station 140.

The input device 112 may be incorporated into a cellular telephone, so that orders may be transmitted to the service facility over the telephone network.

Another embodiment of a generalized remote ordering apparatus is shown in FIGS. 14–16 as reference numeral 210.

The generalized remote ordering apparatus 210 comprises an input device 212 and an ordering station 240 unconnected to the input device 212.

The input device 212 further comprises a keypad 216, a battery (not shown), a first memory 20, a first processor 22, and a transmitter 224. The first memory 20 and first processor 22 may be discrete components or they may be in an Application Specific Integrated Circuit (ASIC) as seen in FIG. 3.

The input device 212 also comprises a bar code reader 226 adapted to read bar code labels L.

The ordering station 240 has a receiver 32 adapted to receive information from the transmitter 224. The ordering station 240 also has a second processor 34 which is adapted to decode information received from the transmitter 224 through the receiver 32 and produce decoded information. A second memory 38 stores item numbers, descriptions, and prices which may be received from a point-of-sale system 40 through a communications link 42. The second memory 38 and second processor 34 may be discrete components, or they may both be in an Application Specific Integrated Circuit (ASIC) as seen in FIG. 4.

In one preferred embodiment, the input device 212 comprises a cellular telephone 250 and the receiver 32 comprises a telephone answering apparatus 242.

If the cellular telephone is analog, the transmitter 224 will include a modem.

In other embodiments, the transmitter 224 and receiver 32 operate in the infrared spectrum or the radio spectrum.

The apparatus 210 may also have a global positioning system (GPS) transceiver 260 that communicates with one or more GPS satellites S.

The apparatus 210 may also have a personal identification apparatus 270 adapted to identify the user of the input device 212. The personal identification apparatus preferably is adapted to identify the user directly by some physical characteristic, instead of requiring the user to input a personal identification number (PIN). This provides additional security, because PINs can be stolen, but physical characteristics of the user cannot be copied.

The physical characteristic that may be used with the personal identification apparatus 270 may be any physical characteristic of the user, but preferably is selected from the group consisting of bioelectric, biochemical, and biomechanical characteristics.

For example, the personal identification apparatus 270 may be adapted to identify the user's voice, the user's thumbprint, or the user's retinal pattern.

Applications of the apparatus 210 may now be illustrated.

If the input device 212 is a cellular telephone 250 equipped with a bar code reader 226, the user may order an item from his home or car for later pickup at a store or restaurant. The store or restaurant may publish a menu of items with corresponding bar codes, either in print or on the World Wide Web. To order an item, the user would dial a central number at which the ordering station is located and the call would be answered by the telephone answering apparatus 242. A series of voice instructions would instruct the user to read the bar code using the bar code reader 226. The ordering station 140 would then communicate with the point-of-sale system to record the sale. In addition, the customer may be required to swipe a credit card through the credit card slot 128, either at home or when at the store.

In another application, the GPS transceiver 260 would indicate the user's location, precise to within 10 feet, and the input device 212 would transmit this location to the ordering station 140 during the ordering process. A delivery person, equipped with another GPS transceiver, would input the GPS coordinates into his transceiver and would be able to go directly to the location at which the ordering user is located. This would be of great value in an environment such as a stadium.

Alternatively, a Wireless Application Protocol (WAP) can be used to locate the position of the caller for routing calls to the nearest provider or delivering the good or services to the user.

In another application, the user may place an order through the store or restaurant's World Wide Web site, using any standard ordering process. When the user arrives at the store or restaurant, the user may activate the input device 212 in order to indicate to the ordering station 140 that the user is present and ready to pick up the item.

In a still further application the user may call a central number to connect to a central computer which will offer a menu of all goods and services available for ordering by remote ordering systems. The central computer will then route the user to a particular order receiving computer or forward orders taken on the central computer. In this manner the user need only remember one number to call to enter the system no matter what goods or services are desired.

In another embodiment the user may call the receiving station phone number for a business and be connected to the central computer which processes the order and debits the customer's account, or credit card and then sends order data to a second computer at a location where the product or service is to be picked up or provided instructing the local branch to provide the goods or services. Alternatively the central computer can send data to be viewed on a screen or printed, instructing the local branch to provide the goods or services. A printer can print labels, receipts or credit card slips directed by the central computer or an on site computer. Inventory control data may be kept on the central, the local computer or both.

In the general case a user can access a receiving station by use of a transmitter, a cell phone, preferably a cell phone with a data display screen, a PDA with a transmitter, a PDA with a cell phone, a PC with a transmitter, or a PC with a cell phone, a tablet PC with a transmitter, or a tablet PC with a cell phone. The transmissions of data can be by wide fidelity (Wi-Fi), wireless personal networks or any other system and may use blue tooth or any other protocol.

The receiving station can send out menus either verbal or written and receive orders for goods or services to be picked up or delivered.

The receiving station can be a general service receiving station and forward calls or order data to other receiving stations for a particular business, which in turn can contact a receiving station or send a message to it's own local branch directing the goods or services to be provided at the location where the customer wishes to pick up the goods or receive the services. The goods or services may also be delivered from the nearest local branch.

The receiving station may be contacted at a central toll free phone number phone for taking orders and handling accounts and inventory data and then sending data to a local receiving station for filling the orders. Alternatively the receiving station can be a central receiving station for the business with a nation wide toll free number and the local branches of the business that fill the orders can have a communications link to receive data for filling the orders. As part of the menu for ordering goods or services the user can select the location for pick up or designate a point of delivery.

There may be many uses for the receiving station. It can control other machines rather than simply provide goods or services. For example the receiving station can be connected to a house to control heat, lock or unlock doors, turn on or off lights, etc. In other applications the receiving station can be connected to an ATM machine for obtaining cash or making deposits, or to a bank computer for transferring funds between the user's accounts or paying bills.

The wireless telecommunications device may have a bioelectronic user identification device for transmitting user identification data to the receiving station. Alternatively receiving station can receive identity data from a bioelectronic identification device at the point of pick up or delivery. Chips in the possession of the customer such as chips imbedded in cards or tags or even chips in the customer can be used for identification.

In the most general case the wireless ordering telecommunications device can connect people, appliances or computers to the ordering station and the ordering station may be connected to appliances, machines or computers.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A remote ordering apparatus comprising:
   a wireless telecommunications device having, a data entry portion, a power source, a first memory, a first processor, a transmitter, and
   a data receiving station to receive data from the wireless telecommunications device, a second processor adapted to process data received by the data receiving station, a second memory adapted to store data, a data output device for directing the delivery of goods or services.

2. A remote ordering apparatus as in claim 1 wherein, the wireless telecommunications device comprises a cell phone and a cell phone network.

3. A remote ordering apparatus as in claim 1 wherein, the wireless telecommunications device comprises a PDA and a transmitter.

4. A remote ordering apparatus as in claim 1 wherein, the wireless telecommunications device comprises a PDA, a cell phone and a cell phone network.

5. A remote ordering apparatus as in claim 1 wherein, the wireless telecommunications device comprises a personal computer and a transmitter.

6. A remote ordering apparatus as in claim 1 wherein, the wireless telecommunications device comprises a personal computer, a cell phone and a cell phone network.

7. A remote ordering apparatus as in claim 1 wherein, the data receiving station is a central computer at a first site, the data output device is at the first site.

8. A remote ordering apparatus as in claim 1 wherein, the data receiving station is a central computer at a first site, the data output device is at a second site.

9. A remote ordering apparatus as in claim 1 wherein, the data receiving station is a central computer at a first site, a second data receiving station is a second computer located at a second site, such that the first data receiving station and second data receiving station transfer data at least one way regarding the transaction.

10. A remote ordering apparatus as in claim 9 wherein, the data output device is at a second site.

11. A remote ordering apparatus as in claim 1 wherein, the data output device is an electronic display screen for displaying orders data such as information about the orders to be filed.

12. A remote ordering apparatus as in claim 1 wherein, the data output device is a printer for printing order information about the orders to be filed and other data and information such as labels, receipts, credit card slips and account information.

13. A remote ordering apparatus as in claim 1 wherein, the data receiving station includes a personal identification portion.

14. A remote ordering apparatus as in claim 13 wherein, the personal identification portion includes a caller identification device to automatically identify the wireless telecommunications device for automatically identifying the account of the person ordering the goods or services.

15. A remote ordering apparatus as in claim 13 wherein, the personal identification portion includes a bioelectronic identification device selected from the group consisting of voice identification, finger print identification, retina identification, facial identification or other means of identifying the purchaser.

16. A remote ordering apparatus as in claim 13 wherein, the personal identification portion includes a chip sensor for detecting the presence of a chip possessed by or implanted in the person ordering the goods or services.

17. A remote ordering apparatus as in claim 1 wherein, the wireless telecommunications device includes a personal identification portion.

18. A remote ordering apparatus as in claim 17 wherein, the wireless telecommunications device includes a bioelectronic identification device selected from the group consisting of voice identification, finger print identification, retina identification, facial identification or other means of identifying the purchaser.

19. A remote ordering apparatus as in claim 1 wherein, the wireless telecommunications device includes a credit card data input device.

20. A remote ordering apparatus as in claim 1 wherein, the data receiving station includes a credit card data input device.

21. A remote ordering apparatus as in claim 1 wherein, a position location device identifies the location of the wireless telecommunications device.

22. A remote ordering apparatus as in claim 21 wherein, the position location device comprises a geo-positioning device.

23. A remote ordering apparatus as in claim 21 wherein, the position location device comprises a wireless application protocol.

24. A remote ordering apparatus as in claim 1 wherein, the data receiving station includes an automated teller machine.

25. A method for remotely ordering items comprising:
   (a) establishing a wireless telecommunications link between a wireless telecommunications device and a data receiving station,
   (b) referring to an ordering code,
   (c) entering the ordering code for a purchase desired,
   (d) transmitting the ordering code data to the data receiving station through the wireless telecommunications link,
   (e) decoding the ordering code by the data receiving station,
   (f) recording the purchases made,
   (g) optionally repeating steps (b) through (f) until all purchases are complete,
   (h) transmitting the decoded order from the data receiving station to a data output device.

26. A method for remotely ordering items as in claim 25 with the further step of:
   transmitting credit card information from the a wireless telecommunications device to the data receiving station.

27. A method for remotely ordering items as in claim 25 with the further step of:
   transmitting the credit card information received from the data receiving station over a communications link to a credit card authorization center for approval.

28. A method for remotely ordering items as in claim 27 with the further step of:
   receiving customer identity information data from the wireless telecommunications device.

29. A method for remotely ordering items as in claim 25 with the further step of:
   receiving customer position information from the wireless telecommunications device by way of a geopositioning satellite device connected to the wireless telecommunications device.

30. A method for remotely ordering items as in claim 25 with the further step of:

receiving customer position information from the wireless telecommunications device by way of a wireless application protocol device connected to the wireless telecommunications device.

31. A method for remotely ordering items as in claim 25 with the further step of:

reading bar codes to enter ordering data into the wireless telecommunications device.

32. A method for remotely ordering items as in claim 25 with the further step of:

signaling the wireless telecommunications device when the order is ready for being picked up.

33. A method for remotely ordering items as in claim 25 with the further step of:

forwarding the data from a the data receiving station to a second data receiving station.

34. A method for remotely ordering items as in claim 25 with the further step of:

providing the goods or services for pick up at a desired location.

35. A method for remotely ordering items as in claim 25 with the further step of:

providing the goods or services for delivery at a desired location.

36. A method for remotely ordering items as in claim 25 with the further step of:

debiting the customer's account for the transaction.

37. A method for remotely ordering items as in claim 25 with the further step of:

debiting the customer's credit card for the transaction.

38. A method for remotely ordering items as in claim 25 with the further step of:

tracking inventory based on sales made.

39. A method for remotely ordering items as in claim 25 with the further step of:

printing a receipt for the customer at a delivery location.

40. A method for remotely ordering items as in claim 25 with the further step of:

printing a credit card slip for signature by the customer.

41. A method for remotely ordering items as in claim 25 with the further step of:

identifying the customer remotely over the telecommunications link.

42. A method for remotely ordering items as in claim 25 with the further step of:

identifying the customer at the location of the transfer of the goods or services.

43. A method for remotely ordering items as in claim 25 with the further step of:

activating an automated teller machine by use of the wireless communications device to take the place of having an automated teller machine card.

44. A method for remotely ordering items as in claim 43 with the further step of:

entering automated teller machine data for the transaction desired by use of the wireless communications device.

45. A method for remotely ordering items as in claim 25 with the further step of:

controlling a device such as a home appliance by use of the wireless communications device.

* * * * *